(12) United States Patent
Zhang et al.

(10) Patent No.: US 12,521,590 B2
(45) Date of Patent: Jan. 13, 2026

(54) FITNESS DEVICE BASED ON DIRECT-DRIVE MOTOR

(71) Applicant: DONGGUAN DIRECT DRIVE TECHNOLOGY LIMITED, Dongguan (CN)

(72) Inventors: Di Zhang, Dongguan (CN); Yanan Yu, Dongguan (CN); Wang Lu, Dongguan (CN); Zhiming Zhong, Dongguan (CN)

(73) Assignee: DONGGUAN DIRECT DRIVE TECHNOLOGY LIMITED, Dongguan (CN)

( * ) Notice: Subject to any disclaimer, the term of this patent is extended or adjusted under 35 U.S.C. 154(b) by 100 days.

(21) Appl. No.: 18/403,761

(22) Filed: Jan. 4, 2024

(65) Prior Publication Data

US 2024/0131381 A1 Apr. 25, 2024
US 2024/0226636 A9 Jul. 11, 2024

Related U.S. Application Data

(63) Continuation of application No. PCT/CN2022/079973, filed on Mar. 9, 2022.

(30) Foreign Application Priority Data

Jul. 5, 2021 (CN) .......................... 202110759098.9

(51) Int. Cl.
*A63B 21/005* (2006.01)
*A63B 21/00* (2006.01)
(Continued)

(52) U.S. Cl.
CPC ........ *A63B 21/0058* (2013.01); *A63B 21/153* (2013.01); *A63B 24/0062* (2013.01);
(Continued)

(58) Field of Classification Search
CPC .............. A63B 21/0058; A63B 21/153; A63B 24/0062; A63B 2024/0093;
(Continued)

(56) References Cited

U.S. PATENT DOCUMENTS

| | | | | |
|---|---|---|---|---|
| 4,138,106 A | * | 2/1979 | Bradley | ........... A63B 21/00076 482/116 |
| 5,304,104 A | * | 4/1994 | Chi | ....................... A63B 21/153 482/99 |

(Continued)

FOREIGN PATENT DOCUMENTS

| | | |
|---|---|---|
| CN | 1105894 A | 8/1995 |
| CN | 105498151 A | 4/2016 |

(Continued)

OTHER PUBLICATIONS

International Search Report of PCT patent application No. PCT/CN2022/079973 issued on May 12, 2022.

(Continued)

*Primary Examiner* — Sundhara M Ganesan
(74) *Attorney, Agent, or Firm* — Andrew C. Cheng (57) ABSTRACT

A fitness device includes a housing, a driving motor mounted on the housing, a fitness pull rope connected to the driving motor, and a control system connected to the driving motor. The control system comprises a main controller, a power module, a communication module, a driving circuit and a sampling module, the power module is electrically connected to the main controller and the communication module, the communication module is electrically connected to the main controller, the sampling module is electrically connected to the driving motor and the main controller, and the driving circuit is electrically connected to the power module, the main controller and the driving motor. The fitness pull rope is arranged on the driving motor functioning as a full driver, and the control system is used (Continued)

for controlling the pull force of the driving motor, thereby realizing smart fitness.

7 Claims, 11 Drawing Sheets

(51) Int. Cl.
    *A63B 24/00*         (2006.01)
    *A63B 71/06*         (2006.01)
    *H02K 7/14*          (2006.01)

(52) U.S. Cl.
    CPC ........ *H02K 7/14* (2013.01); *A63B 2024/0093* (2013.01); *A63B 2071/0675* (2013.01)

(58) Field of Classification Search
    CPC ........ A63B 2071/0675; A63B 2225/20; A63B 2225/50; A63B 21/0059; A63B 21/4043; A63B 23/12; A63B 21/4033; H02K 7/14; H02K 2211/03; H02K 7/10; H02K 7/1861; H02K 11/30; H02K 11/33; H02K 21/22; H02K 11/0094; H02K 11/27; H02P 27/06; H02P 5/74; Y10S 388/9075
    See application file for complete search history.

(56) References Cited

U.S. PATENT DOCUMENTS

| | | | | |
|---|---|---|---|---|
| 5,360,382 A * | 11/1994 | Chi | ........ | A63B 21/0058 482/99 |
| 5,433,678 A * | 7/1995 | Chi | ........ | A63B 21/0058 482/99 |
| 8,900,099 B1 * | 12/2014 | Boyette | ........ | A63B 71/0619 482/901 |
| 10,143,880 B1 * | 12/2018 | Boatwright | ........ | A63B 21/078 |
| 11,819,736 B2 * | 11/2023 | Gilstrom | ........ | A63B 21/153 |
| 2007/0155587 A1 * | 7/2007 | Huang | ........ | A63B 23/12 482/148 |
| 2012/0053014 A1 * | 3/2012 | Zhu | ........ | A63B 21/4035 482/5 |
| 2014/0038777 A1 * | 2/2014 | Bird | ........ | A63B 23/03525 482/5 |
| 2014/0194250 A1 * | 7/2014 | Reich | ........ | A63B 24/0084 482/5 |
| 2014/0287876 A1 * | 9/2014 | Etter | ........ | A63B 24/0087 482/5 |
| 2018/0214729 A1 * | 8/2018 | Rubin | ........ | A63B 24/0087 |
| 2019/0099637 A1 * | 4/2019 | Valente | ........ | A63B 21/0058 |
| 2019/0344123 A1 * | 11/2019 | Rubin | ........ | A63B 21/0058 |
| 2021/0013781 A1 | 1/2021 | Hu | | |
| 2021/0236876 A1 * | 8/2021 | Gregory | ........ | A63B 21/4035 |
| 2021/0331038 A1 * | 10/2021 | Hendricks | ........ | A63B 24/0087 |
| 2021/0339078 A1 * | 11/2021 | Akeel | ........ | A63B 21/4035 |
| 2021/0394010 A1 * | 12/2021 | Hansen | ........ | A63B 21/025 |
| 2022/0305320 A1 * | 9/2022 | Wang | ........ | A63B 21/153 |
| 2022/0339488 A1 * | 10/2022 | Belson | ........ | A63B 24/0087 |
| 2023/0166150 A1 * | 6/2023 | Liu | ........ | A63B 21/00076 482/5 |
| 2023/0310940 A1 * | 10/2023 | Lee | ........ | A63B 21/0058 482/4 |
| 2024/0108939 A1 * | 4/2024 | Perry | ........ | A63B 23/03541 |
| 2024/0374953 A1 * | 11/2024 | Kerloc'h | ........ | A63B 21/0088 |
| 2025/0161735 A1 * | 5/2025 | Mehtälä | ........ | A63B 21/153 |

FOREIGN PATENT DOCUMENTS

| | | |
|---|---|---|
| CN | 108654011 A | 10/2018 |
| CN | 208424164 U | 1/2019 |
| CN | 210409356 U | 4/2020 |
| CN | 113318388 A | 8/2021 |
| EP | 3182575 B1 | 12/2020 |
| JP | 013358 U | 3/1995 |
| JP | 2005295740 A | 10/2005 |
| JP | 2012165521 A | 8/2012 |
| WO | 2019222114 A1 | 11/2019 |
| WO | 2021046596 A1 | 3/2021 |

OTHER PUBLICATIONS

Search Report of CN application No. 202110759098.9 issued on Jan. 24, 2022.
The extended European search report of EP patent application No. 22836510.2 issued on Dec. 19, 2024.
The office action of JP patent application No. 2023-580853 issued on Dec. 24, 2024.
The Office Action of KR patent application No. 10-2024-7002703 issued on Jun. 25, 2025.

* cited by examiner

FITNESS DEVICE BASED ON DIRECT-DRIVE MOTOR

CROSS-REFERENCE OF RELATED APPLICATION

The application claims priority to Chinese Patent Application No. 202110759098.9, entitled "Fitness Device Based on Direct-drive Motor", filed with the China National Intellectual Administration on Jul. 5, 2021, which is incorporated herein by reference in its entirety.

FIELD

The invention relates to the technical field of smart fitness, in particular to a fitness device based on a direct-drive motor.

BACKGROUND

The improvement of people's living standard leads to gradual integration of cleaning robots into people's home life. Existing cleaning robots use a brush motor as the power source, a reduction box is used as a drive unit between the brush motor and separately arranged tires to reduce speed and increase force to provide power for travelling of the cleaning robots. With the development of the times and the progress of the society, people pay more and more attention to their physical health, so fitness devices are becoming more and more popular. Doing fitness exercise can improve the mood, resist chromic diseases, control the body weight, strengthen the cardio-pulmonary function, and promote better sleep.

At present, there are a wide variety of fitness devices with different functions on the market. Pull exercise is simple, thus being widely popularized. Pull fitness devices for healthcare still need to be improved. Traditional force-adjustable pull fitness devices are heavy and occupy a large area. The pull force of small and light pull-up bars cannot be changed, which is not beneficial to exercise of users.

SUMMARY

The objective of the invention is to solve the above technical problems by providing a fitness device based on a direct-drive motor, which has a fitness pull rope arranged on a driving motor functioning as a pull driver and adopts a control system to control the pull force of the driving motor to realize smart fitness.

The above objective can be fulfilled through following technical solution:

A fitness device based on a direct-drive motor, characterized by comprising a housing, a driving motor mounted on the housing, a fitness pull rope connected to the driving motor, and a control system connected to the driving motor. The control system comprises a main controller, a power module, a communication module, a driving circuit and a sampling module, the power module is electrically connected to the main controller and the communication module, the communication module is electrically connected to the main controller, the sampling module is electrically connected to the driving motor and the main controller, and the driving circuit is electrically connected to the power module, the main controller and the driving motor.

Details of one or more embodiments of the invention are presented in the following drawings and description. Other features, objectives and advantages of the invention will become obvious in the specification, drawings and claims.

Compared with traditional fitness devices, the fitness device provided by the invention is a pull fitness device, which has a fitness pull rope arranged on a driving motor functioning as a pull driver and adopts a control system to control the pull force of the driving motor, thereby realizing smart fitness. The control system receives an input corresponding pull force instruction through a communication module, a main controller outputs a corresponding program to a driving circuit through a control algorithm after acquiring the instruction, the driving circuit controls on/off of the three-phase current of the driving motor, and then a sampling module continuously compares the sampled current of the driving motor with the input instruction and adjusts the current continuously until the pull force output by the driving motor reaches the value in the input instruction, such that the pull force can be adjusted freely. Specifically, the fitness device comprises a housing, a driving motor mounted on the housing, a fitness pull rope connected to the driving motor, and a control system connected to the driving motor; and the control system comprises a main controller, a power module, a communication module, a driving circuit and a sampling module, the power module is electrically connected to the main controller and the communication module, the communication module is electrically connected to the main controller, the sampling module is electrically connected to the driving motor and the main controller, and the driving circuit is electrically connected to the power module, the main controller and the driving motor. The direct-drive motor functions as a driving source of the pull fitness device, and the control system is used for realizing intelligent control, such that the practicability is high, and the intelligent level is high.

BRIEF DESCRIPTION OF THE DRAWINGS

Embodiments and/or examples of the invention disclosed here can be better described and explained with reference to one or more drawings. Additional details or examples for describing the drawings should not be construed as limitations of any one of the invention disclosed, currently described embodiments and/or examples, and currently appreciated optimal modes of the invention.

In the drawings.

Reference signs: 1, housing; 11, operation panel; 2, driving motor; 21, base; 211, internal end; 211a, mounting stand; 211b, gaps; 212, external end; 213, rotary mounting cavity; 22, stator assembly; 221, iron core; 222, coil; 223, armature rib; 23, rotary shaft assembly; 231, bearing assembly; 232, rotary shaft; 233, fixing element; 24, rotor assembly; 241, outer end cover; 241a, reinforcing stand; 241b, pull rope reel; 242, connecting ring; 243, rotor element; 244, inner end cover; 25, motor control plate; 3, fitness pull rope; 31, grip ring; 4, control system; 41, main controller; 42, power module; 43, communication module; 44, driving circuit; 45, sampling module.

DESCRIPTION OF THE EMBODIMENTS

To gain a better understanding of the invention, the invention will be described more comprehensively below with reference to related drawings. The drawings illustrate preferred embodiments of the invention. However, the invention can be implemented in many different forms, and is not limited to the embodiments described in the specification. On the contrary, these embodiments are provided for a more thorough and comprehensive understanding of the disclosure of the invention.

It should be noted that when one element is referred to as being "fixed to" the other element, it may be directly fixed to the other element or there may be an intermediate element between the two elements. When one element is referred to as being "connected to" the other element, it may be directly connected to the other element or there may be an intermediate element between the two elements.

Unless otherwise defined, all technical and scientific terms used in the specification have the same meanings as commonly understood by those skilled in the art. The terms used in the specification of the invention are merely for the purpose of describing specific embodiments of the invention and are not intended to limit the invention.

As shown in FIGS. 1-11, a fitness device based on a direct-drive motor comprises a housing 1, a driving motor 2 mounted in the housing 1, a fitness pull rope 3 connected to the driving motor 2, and a control system 4 connected to the driving motor 2. The control system 4 comprises a main controller 41, a power module 42, a communication module 43, a driving circuit 44 and a sampling module 45. The power module 42 is electrically connected to the main controller 41 and the communication module 43, the communication module 43 is electrically connected to the main controller 41, the sampling module 45 is electrically connected to the driving motor 2 and the main controller 41, and the driving circuit 44 is electrically connected to the power module 42, the main controller 41 and the driving motor 2.

Figure 1:
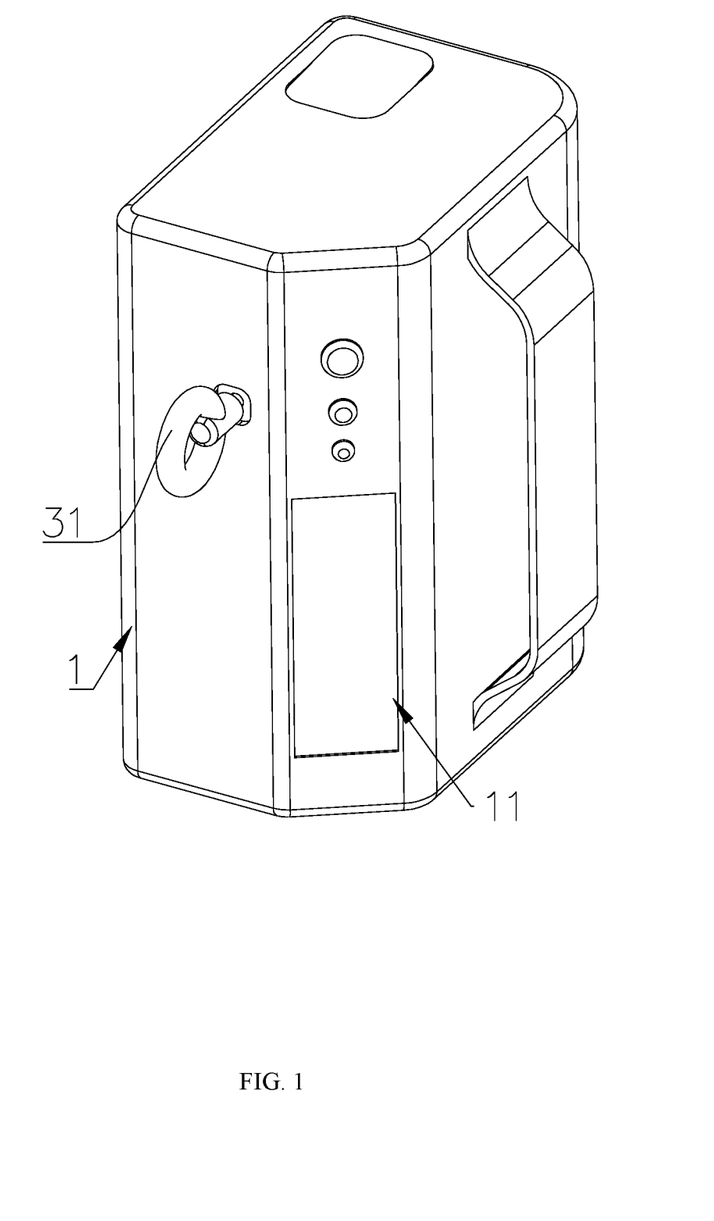
FIG. 1 is a perspective view of a fitness device according to the invention.
Figure 2:
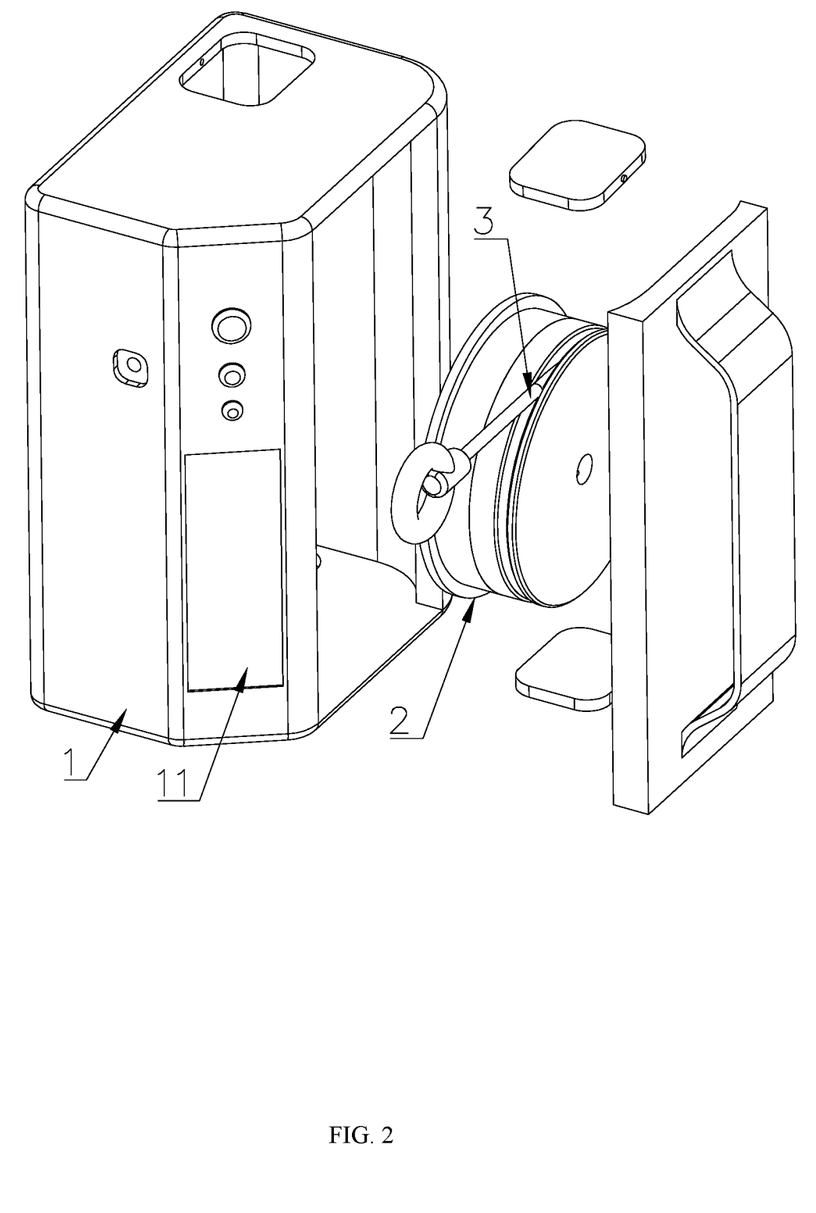
FIG. 2 is an exploded view of the fitness device in FIG. 1.

The housing 1 is provided with an operation panel 11 electrically connected to the communication module 43. The operation panel 11 is configured to input an instruction to the communication module 43 to facilitate operation and use, and motions can be recorded through the operation panel 11, thereby achieving high practicability.

Referring to FIGS. 4-7, the driving motor 2 comprises a base 21, a stator assembly 22 arranged on an outer edge of the base 21, a rotary shaft assembly 23 arranged in the base 21, a rotor assembly 24 connected to the rotary shaft assembly 23 and covering the stator assembly 22, and a motor control plate 25 arranged on the base 21 and connected to the driving circuit 44. During the operating process of the driving motor 2, motor driving is controlled through the motor control plate 25, the rotor assembly 24 and the stator assembly 22 work together to implement the driving process, and the rotary shaft assembly 23 works together with the rotor assembly 24 to realize stable rotation in the base 21, thereby achieving high driving precision.

Figure 5:
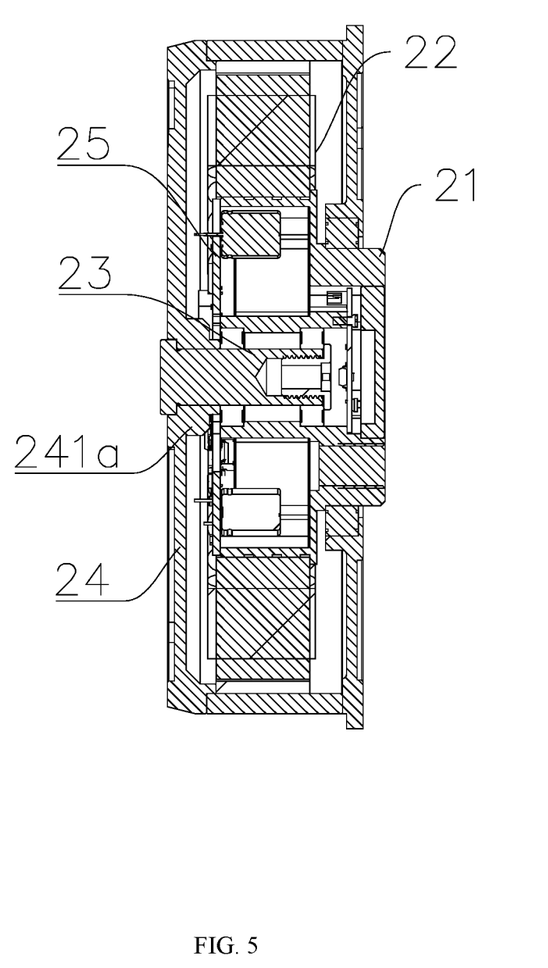
FIG. 5 is a sectional view taken along line A-A in FIG. 4.
Figure 6:
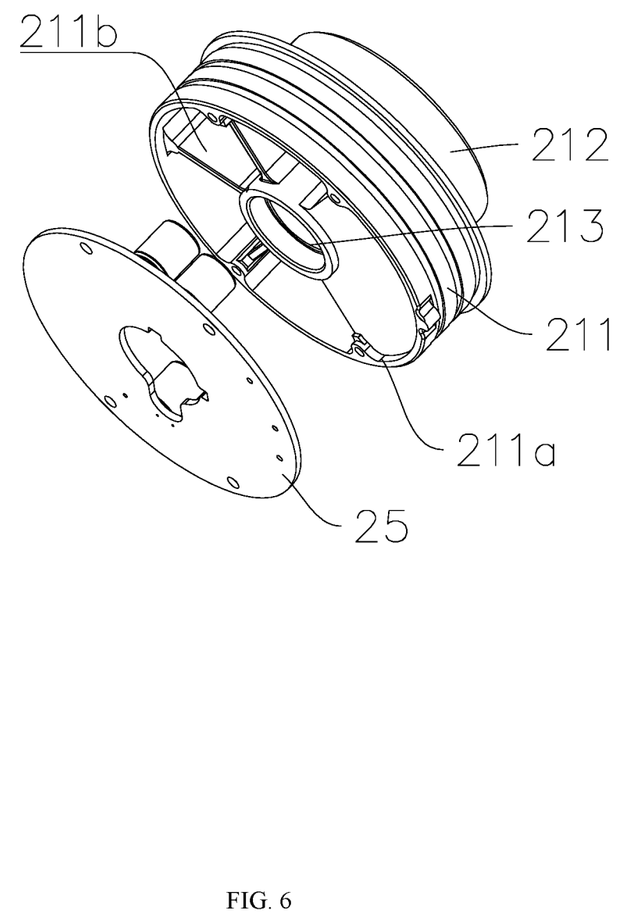
FIG. 6 illustrates a base of the driving motor in FIG. 5.
Figure 7:
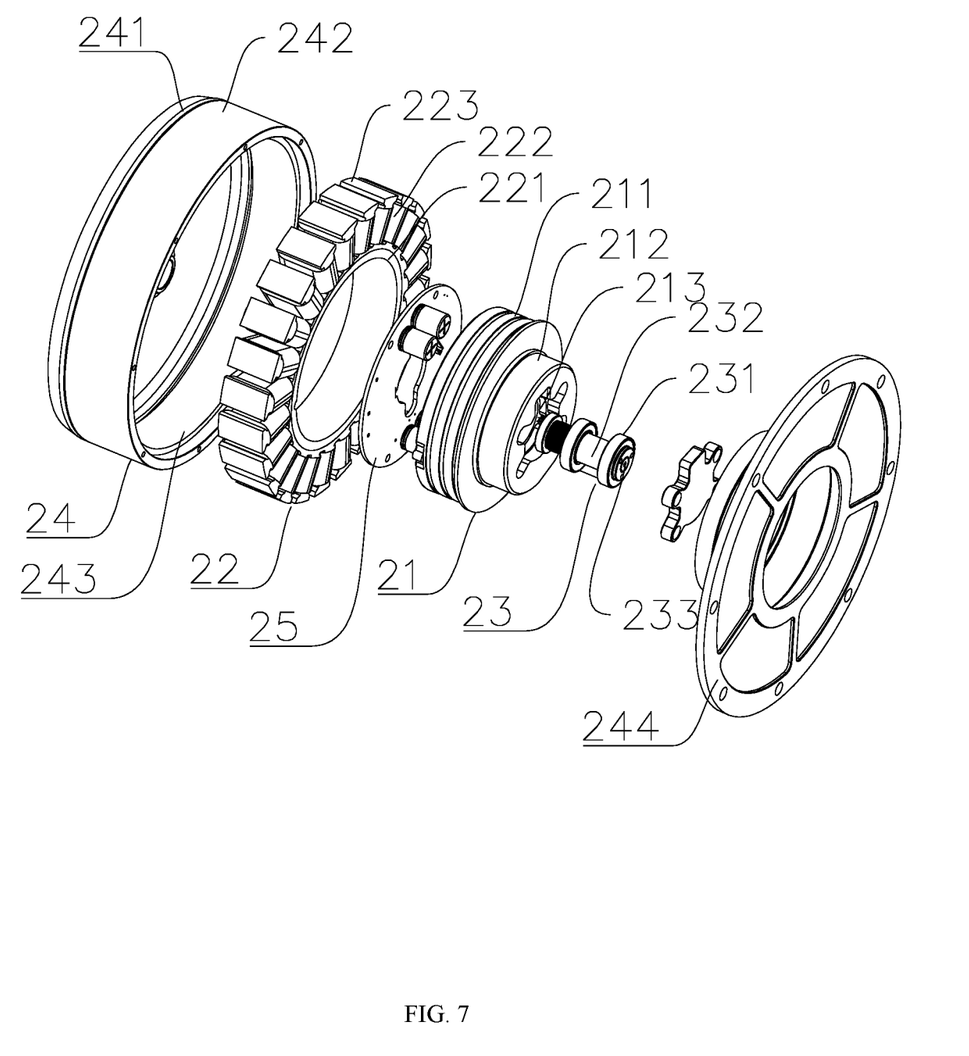
FIG. 7 is an exploded view of the driving motor according to the invention.

The base 21 comprises an internal end 211, an external end 212 and a rotary mounting cavity 213 passing through the internal end 211 and the external end 212, the rotary shaft assembly 23 is rotatably mounted in the rotary mounting cavity 213, a mounting stand 211a is arranged at the internal end 211, an internal groove 212a is formed in the external end 212, a convex ring is arranged on an outer edge of the mounting stand 211a, mounting holes are defined in the convex ring, a plurality of gaps 211b are formed in the mounting stand 211a, and through holes are formed in the external end 212. The through holes are connected to the gaps 211b and located on one side of the internal groove 212b. The internal end 211 and the external end 212 are used for installation of internal structure and connection of external structure respectively, and the rotary mounting cavity 213 is used for mounting and fixing the rotary shaft assembly 23, such that installation is easy. The gaps 211b and the mounting stand 211a work together to realize installation of the motor control plate 25, such that the structure is reliable.

The stator assembly 22 comprises an iron core 221 and coils 222 regularly arranged on the iron core 221. The iron core 221 comprises a plurality of teeth 223 regularly arranged in a circumferential direction thereof. The coils 222 are wound around the teeth 223. An outer circumferential surface of the internal end 211 is provided with a plurality of fastening grooves corresponding to an inner circumferential surface of the iron core 221. The coils 222 are wound around the teeth 223, such that the structure is simple, and the stability is good.

The rotary shaft assembly 23 comprises a bearing assembly 231 mounted in the rotary mounting cavity 213 and a rotary shaft 232 rotatably mounted in the bearing assembly 231. One end of the rotary shaft 232 is connected to the rotor assembly 24, and a fixing element 233 is mounted at the other end of the rotary shaft 232. The rotary mounting cavity 213 is provided with a first limit groove and a second limit groove, the bearing assembly 231 comprises two bearings, and the two bearings are mounted in the first limit groove and the second limit groove respectively. The two bearings are used for mounting the rotary shaft 232, such that installation is easy, and the structure is stable.

The rotor assembly 24 comprises an outer end cover 241 connected to the rotary shaft assembly 23, a connecting ring 242 connected to the outer end cover 241 and corresponding to an outer edge of the stator assembly 22, and a rotor element 243 mounted on the connecting ring 242 and corresponding to the stator assembly 22, an inner end cover 244 is connected to a side, away from the outer end cover 241, of the connecting ring 242, and the inner end cover 244 is rotatably connected to an outer circumferential surface of the external end 212. The outer end cover 241 works together with the connecting ring 242 to realize structural connection, and the rotor element 243 works together with the stator assembly 22 to realize motor driving, such that driving is stable.

The outer end cover 241 is provided with a reinforcing stand 241a, the reinforcing stand 241a is provided with a connecting hole, a limit shoulder is arranged in the connecting hole, and the outer end cover 241 is connected to the rotary shaft assembly 23 through the connecting hole. The inner end cover 244 is connected to a connecting bearing, and the connecting bearing is disposed around the outer circumferential surface of the external end 212. The outer end cover 241 can be connected to the rotary shaft assembly 23 through the reinforcing stand 241a and the limit shoulder, such that connection is easy, and the structure is stable.

Figure 3:
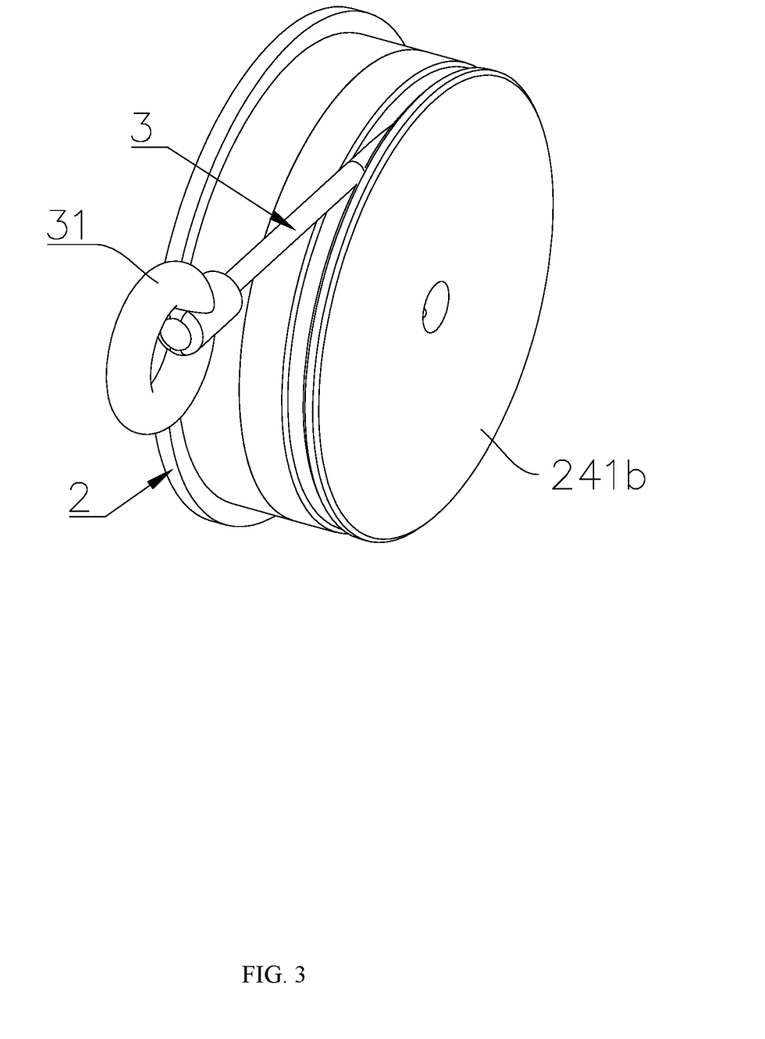
FIG. 3 illustrates a driving motor and a fitness pull rope in FIG. 2.
Figure 4:
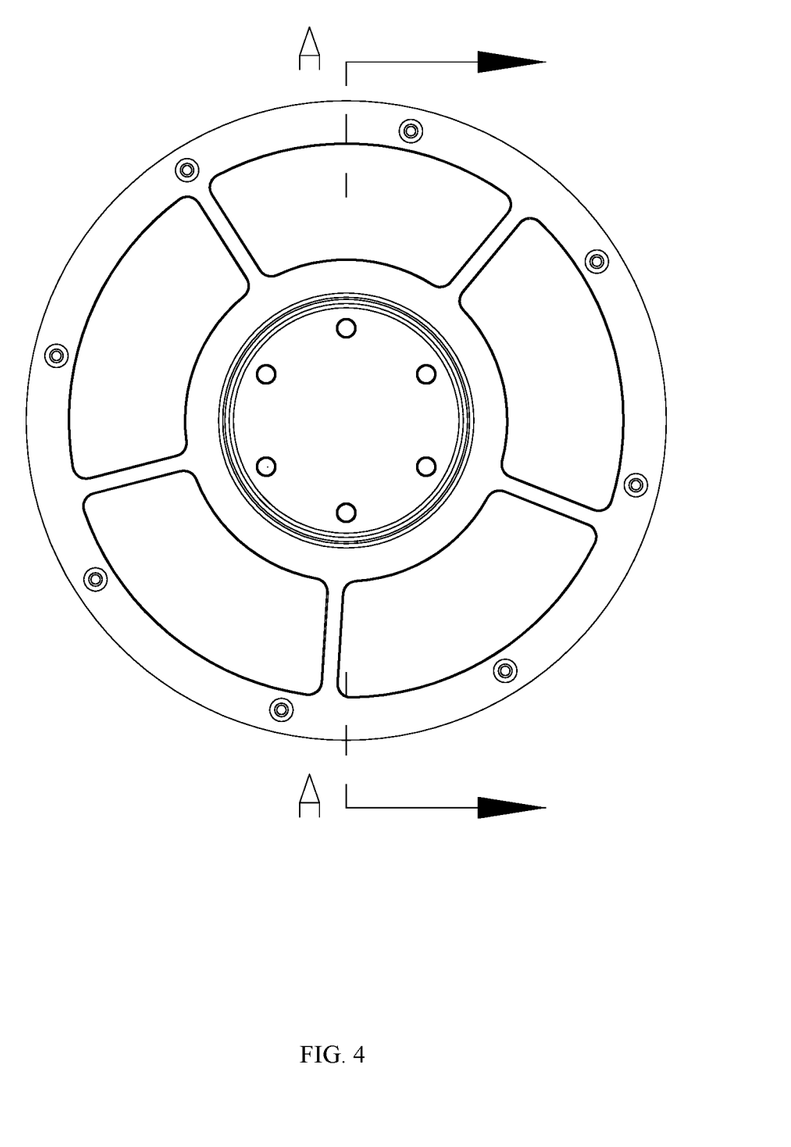
FIG. 4 is a front view of the driving motor according to the invention.

The outer end cover 241 is fixedly connected to a pull rope reel 241*b*, and the fitness pull rope 3 is wound around the pull rope reel 241*b*, extends out of the housing 1 and is connected to a grip ring 32. The outer end cover 341 is connected to the pull rope reel 241*b* and drives the pull rope reel 241*b* to drive the fitness pull rope 3 to move, such that operation and use of exercisers are facilitated.

Figure 8:
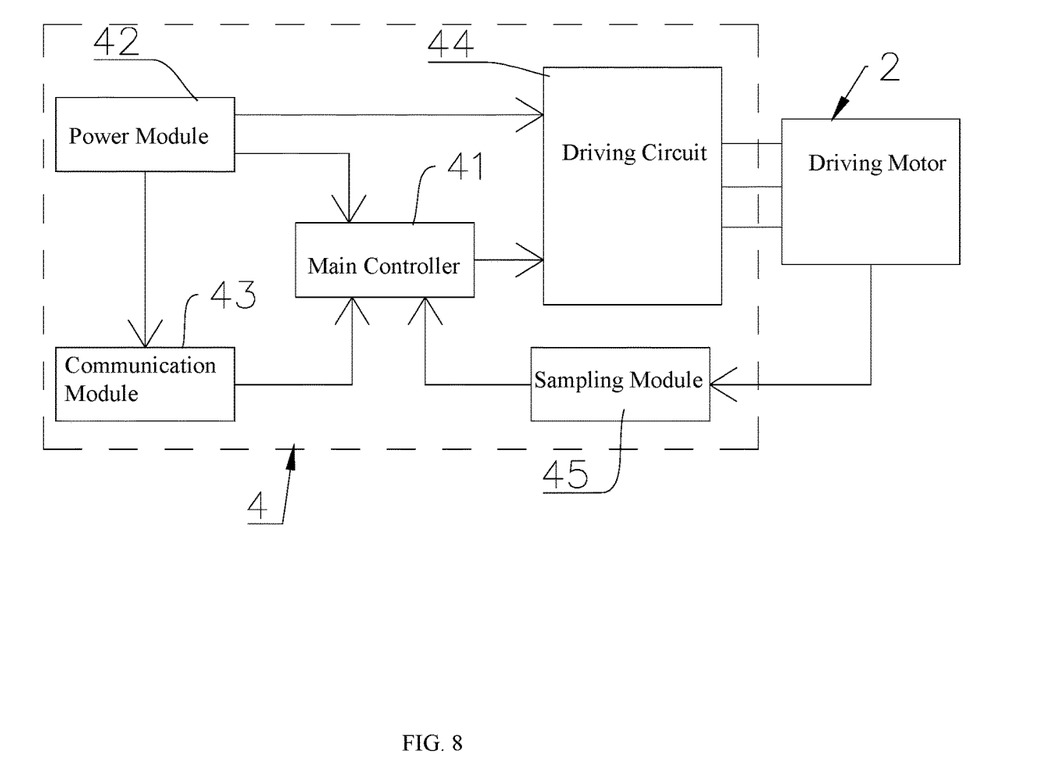
FIG. 8 is a schematic connection diagram of a control system according to the invention.
Figure 9:
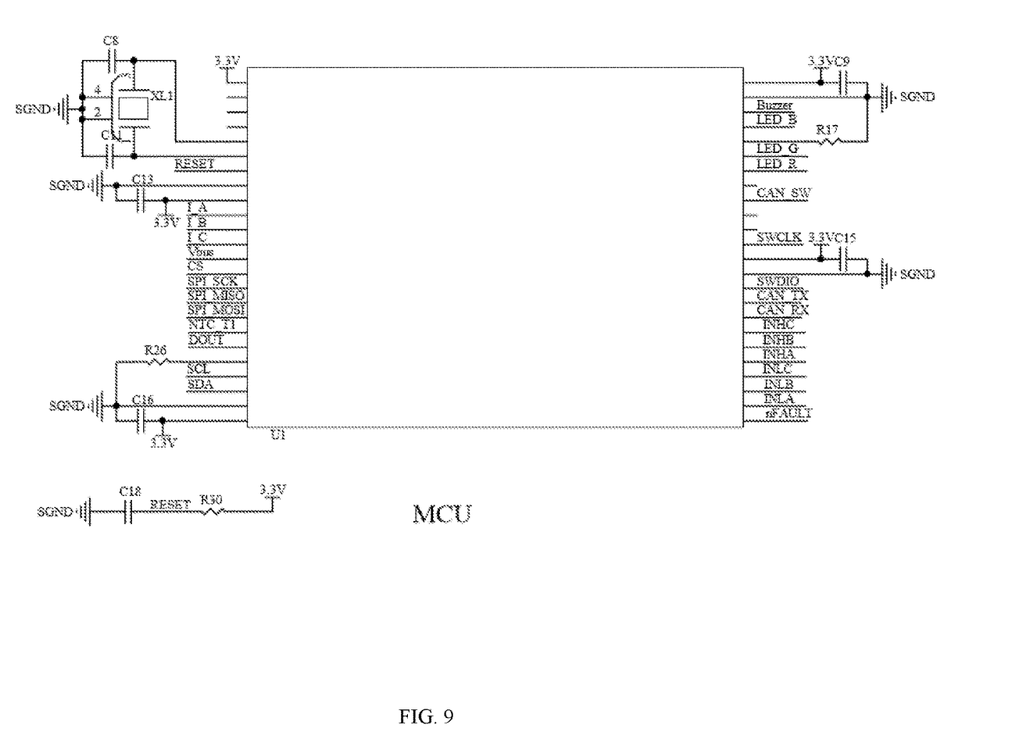
FIG. 9 is a circuit diagram of a main controller of the control system in FIG. 8.
Figure 10:
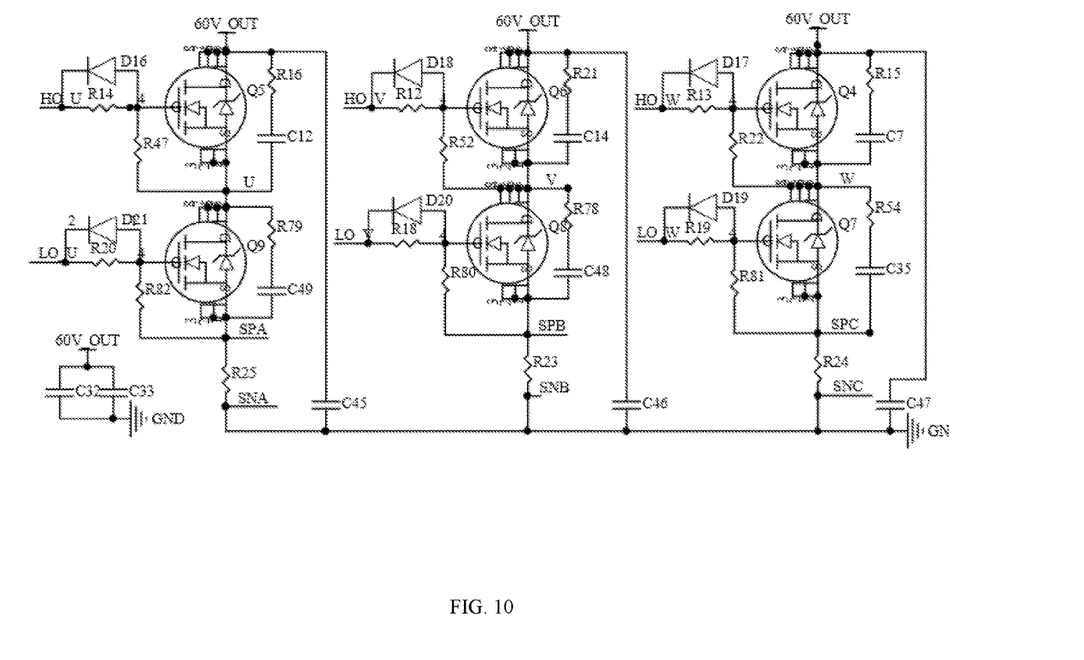
FIG. 10 is a circuit diagram of a driving circuit of the control system in FIG. 8.
Figure 11:
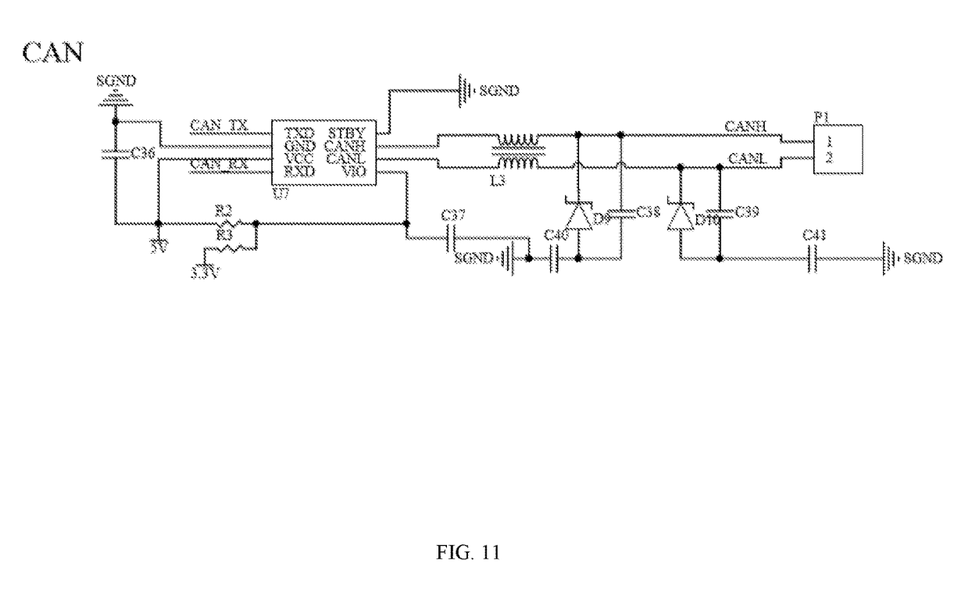
FIG. 11 is a circuit diagram of a communication module of the control system in FIG. 8.

The main controller 41 is an MCU processor, the communication module 43 is a communication interface connected to the operation panel 11, and the sampling module 45 is a current sampling module and is used for sampling the current of the driving motor 2. The MCU processor is used as the main controller 41 and cooperates with the communication interface to realize intelligent control, such that the control effect is good, and the intelligent level is high.

Referring to FIGS. 8-11, the fitness device provided by the invention is a pull fitness device, which has the fitness pull rope 3 arranged on the driving motor 2 functioning as a pull driver and adopts the control system 4 to control the pull force of the driving motor 2, thereby realizing smart fitness. The control system 4 receives an input corresponding pull force instruction through the communication module 43, the main controller 41 outputs a corresponding program to the driving circuit 44 through a control algorithm after acquiring the instruction, the driving circuit 44 controls on/off of the three-phase current of the driving motor 2, and then the sampling module 45 continuously compares the sampled current of the driving motor 2 with the input instruction and adjusts the current continuously until the pull force output by the driving motor 2 reaches the value in the input instruction, such that the pull force can be adjusted freely. Specifically, the fitness device comprises the housing 1, the driving motor 2 mounted on the housing 1, the fitness pull rope 3 connected to the driving motor 2, and the control system 4 connected to the driving motor 2; and the control system 4 comprises the main controller 41, the power module 42, the communication module 43, the driving circuit 44 and the sampling module 45, the power module 42 is electrically connected to the main controller 41 and the communication module 43, the communication module 43 is electrically connected to the main controller 41, the sampling module 45 is electrically connected to the driving motor 2 and the main controller 41, and the driving circuit 44 is electrically connected to the power module 42, the main controller 41 and the driving motor 2. The direct-drive motor is used as a driving source of the pull fitness device, and the control system 4 is used for realizing intelligent control, such that the practicability is high, and the intelligent level is high.

The above embodiments merely represent several implementations of the invention and are specifically described in detail, but they should not be construed as limitations of the patent scope of the invention. It should be pointed out that those ordinarily skilled in the art can make various transformations and improvements without departing from the concept of the invention, and all these transformations and improvements should fall within the protection scope of the invention. Therefore, the protection scope of the invention patent should be defined by the appended claims.

What is claimed is:

1. A fitness device based on a direct-drive motor, comprising a housing, a driving motor mounted on the housing, a fitness pull rope connected to the driving motor, and a control system connected to the driving motor, wherein the control system comprises a main controller, a power module, a communication module, a driving circuit and a sampling module, the power moule is electrically connected to the main controller and the communication module, the communication module is electrically connected to the main controller, the sampling module is electrically connected to the driving motor and the main controller, and the driving circuit is electrically connected to the power module, the main controller and the driving motor;

wherein the driving motor comprises a base, a stator assembly arranged on an outer edge of the base, a rotary shaft assembly arranged in the base, a rotor assembly connected to the rotary shaft assembly and covering the stator assembly, and a motor control plate arranged on the base and connected to the driving circuit;

the rotor assembly comprises an outer end cover connected to the rotary shaft assembly, a connecting ring connected to the outer end cover and corresponding to an outer edge of the stator assembly, and a rotor element mounted to the connecting ring and corresponding to the stator assembly, an inner end cover is connected to a side, away from the outer end cover, of the connecting ring, the inner end cover is rotatably connected to an outer circumferential surface of the external end;

the outer end cover is fixedly connected to a pull rope reel, and the fitness pull rope is wound around the pull rope reel, extends out of the housing and is connected to a grip ring; and wherein the sampling module is a current sampling module and used for sampling a current of the driving motor, the sampling module continuously compares a sampled current of the driving motor with an input instruction and adjusts the current continuously until the pull force output by the driving motor reaches the value in the input instruction.

2. The fitness device based on a direct-drive motor according to claim 1, wherein the housing is provided with an operation panel electrically connected to the communication module.

3. The fitness device based on a direct-drive motor according to claim 2, wherein the main controller is an MCU processor, and the communication module is a communication interface connected to the operation panel.

4. The fitness device based on a direct-drive motor according to claim 1, wherein the base comprises an internal end, an external end and a rotary mounting cavity passing through the internal end and the external end, the rotary shaft assembly is rotatably mounted in the rotary mounting cavity, a mounting stand is arranged at the internal end, an internal groove is formed in the external end, a convex ring is arranged on an outer edge of the mounting stand, a mounting hole is formed in the convex ring, a plurality of gaps are formed in the mounting stand, and through holes are formed in the external end, connected to the gaps and located on a side of the internal groove.

5. The fitness device based on a direct-drive motor according to claim 4, wherein the stator assembly comprises an iron core and coils regularly arranged on the iron core, the iron core comprises a plurality of teeth arranged in a circumferential direction thereof, the coils are wound around the teeth, and an outer circumferential surface of the internal end is provided with a plurality of fastening grooves corresponding to an inner circumferential surface of the iron core.

6. The fitness device based on a direct-drive motor according to claim 5, wherein the rotary shaft assembly comprises a bearing assembly mounted in the rotary mounting cavity and a rotary shaft rotatably mounted in the bearing assembly, one end of the rotary shaft is connected to the rotor assembly, and a fixing element is mounted at the other end of the rotary shaft; and the rotary mounting cavity is provided with a first limit groove and a second limit groove, the bearing assembly is provided with two bearings, and the two bearings are mounted in the first limit groove and the second limit groove respectively.

7. The fitness device based on a direct-drive motor according to claim 1, wherein the outer end cover is provided with a reinforcing stand, the reinforcing stand is provided with a connecting hole, a limit shoulder is arranged in the connecting hole, and the outer end cover is connected to the rotary shaft assembly through the connecting hole; and the inner end cover is connected to a connecting bearing, and the connecting bearing is disposed around the outer circumferential surface of the external end.

* * * * *